US012466096B2

(12) United States Patent
Mackinnon et al.

(10) Patent No.: US 12,466,096 B2
(45) Date of Patent: Nov. 11, 2025

(54) SYSTEM AND BLADE ASSEMBLY FOR CUTTING FOOD PIECES

(71) Applicant: Cavendish Farms Corporation, Dieppe (CA)

(72) Inventors: Jason Mackinnon, Charlottetown (CA); Alan Thorpe, St. Eleanors (CA)

(73) Assignee: Cavendish Farms Corporation, Dieppe (CA)

( * ) Notice: Subject to any disclaimer, the term of this patent is extended or adjusted under 35 U.S.C. 154(b) by 348 days.

(21) Appl. No.: 17/975,663

(22) Filed: Oct. 28, 2022

(65) Prior Publication Data

US 2023/0140088 A1 May 4, 2023

(30) Foreign Application Priority Data

Oct. 28, 2021 (CA) ..................................... 3136442

(51) Int. Cl.

| | |
|---|---|
| ***B26D 1/00*** | (2006.01) |
| ***B26D 1/03*** | (2006.01) |
| ***B26D 7/06*** | (2006.01) |
| ***B26D 7/26*** | (2006.01) |

(52) U.S. Cl.

CPC ............. *B26D 1/0006* (2013.01); *B26D 1/03* (2013.01); *B26D 7/0658* (2013.01); *B26D 7/2614* (2013.01); *B26D 2001/0033* (2013.01); *B26D 2001/004* (2013.01); *B26D 2001/006* (2013.01); *B26D 2001/0073* (2013.01); *B26D 2210/02* (2013.01)

(58) Field of Classification Search

CPC ...... B26D 1/0006; B26D 1/03; B26D 7/0658; B26D 7/2614; B26D 2001/0033; B26D 2001/004; B26D 2001/006; B26D 2001/0073; B26D 2210/02

USPC ............................................................. 83/13

See application file for complete search history.

(56) References Cited

U.S. PATENT DOCUMENTS

| | | | |
|---|---|---|---|
| 4,082,024 | A | 4/1978 | Hodges et al. |
| 4,135,002 | A | 1/1979 | Hodges et al. |
| 4,423,652 | A | 1/1984 | Winslow |
| 4,614,141 | A | 9/1986 | Mendenhall et al. |
| RE32,822 | E | 1/1989 | Hodges et al. |
| 6,413,566 | B2 | 7/2002 | Caridis et al. |

(Continued)

FOREIGN PATENT DOCUMENTS

| | | | |
|---|---|---|---|
| CA | 2329594 | A1 | 12/2000 |
| CA | 2354324 | C | 8/2002 |

(Continued)

*Primary Examiner* — Adam J Eiseman
*Assistant Examiner* — Fred C Hammers
(74) *Attorney, Agent, or Firm* — Dicke, Billig & Czaja, PLLC

(57) ABSTRACT

Existing blade assemblies for cutting complex three-dimensional shapes such as twisted shapes are typically slow and suffer from frequent breakdowns. Disclosed herein is a stationary blade assembly for cutting food products into complex shapes as the food products are directed along a direction of flow at the blade assembly, wherein the blade assembly comprises a plurality of blades, each of the plurality of blades having a length, wherein the length of the blade is oriented along the direction of flow and the blade is twisted along its length, whereby the food products are rotated by the blade during cutting.

20 Claims, 10 Drawing Sheets

(56) References Cited

U.S. PATENT DOCUMENTS

| | | | |
|---|---|---|---|
| 6,457,393 | B1 | 10/2002 | Englar |
| 6,729,218 | B2 | 5/2004 | Somsen |
| 6,805,030 | B2 | 10/2004 | Englar et al. |
| 6,973,862 | B2 | 12/2005 | Bucks |
| D640,036 | S | 6/2011 | Walker et al. |
| D688,437 | S | 8/2013 | Walker et al. |
| D707,418 | S | 6/2014 | Rogers et al. |
| D712,618 | S | 9/2014 | Rogers et al. |
| D714,017 | S | 9/2014 | Rogers et al. |
| D714,517 | S | 10/2014 | Rogers et al. |
| D716,517 | S | 11/2014 | Walker et al. |
| D716,518 | S | 11/2014 | Walker et al. |
| D716,519 | S | 11/2014 | Walker et al. |
| D716,520 | S | 11/2014 | Walker et al. |
| D720,916 | S | 1/2015 | Rogers et al. |
| D721,217 | S | 1/2015 | Rogers et al. |
| D721,218 | S | 1/2015 | Rogers et al. |
| D722,417 | S | 2/2015 | Rogers et al. |
| D723,241 | S | 3/2015 | Walker et al. |
| D723,242 | S | 3/2015 | Walker et al. |
| D723,243 | S | 3/2015 | Walker et al. |
| D725,343 | S | 3/2015 | Rogers et al. |
| D728,892 | S | 5/2015 | Rogers et al. |
| D729,491 | S | 5/2015 | Rogers et al. |
| D729,492 | S | 5/2015 | Rogers et al. |
| D735,441 | S | 8/2015 | Rogers et al. |
| D742,091 | S | 11/2015 | Rogers et al. |
| D745,245 | S | 12/2015 | Rogers et al. |
| D746,019 | S | 12/2015 | Rogers et al. |
| 9,227,336 | B2 | 1/2016 | Hebbeln |
| D748,366 | S | 2/2016 | Rogers et al. |
| D762,341 | S | 8/2016 | Rogers et al. |
| D766,542 | S | 9/2016 | Walker et al. |
| 9,446,531 | B2 | 9/2016 | Mathues et al. |
| 9,776,335 | B2 | 10/2017 | Justesen et al. |
| 9,943,978 | B2 | 4/2018 | Walker et al. |
| D822,320 | S | 7/2018 | Walker |
| 10,160,132 | B2 | 12/2018 | Walker et al. |
| 10,583,578 | B2 | 3/2020 | Justesen et al. |
| 2001/0011491 | A1* | 8/2001 | Somsen ................ B26D 3/185 83/402 |
| 2001/0026824 | A1* | 10/2001 | Caridis .................. A23N 15/00 426/331 |
| 2002/0122859 | A1* | 9/2002 | Englar ................ B26D 7/0658 426/518 |
| 2016/0107325 | A1 | 4/2016 | Rogers et al. |
| 2016/0121503 | A1* | 5/2016 | Hebbeln .................. B26D 1/02 83/402 |
| 2017/0072581 | A1* | 3/2017 | Walker ..................... B26D 3/26 |
| 2019/0001517 | A1 | 1/2019 | Walker et al. |
| 2019/0351572 | A1 | 11/2019 | Justesen et al. |

FOREIGN PATENT DOCUMENTS

| | | | |
|---|---|---|---|
| CA | 2371451 | A1 | 8/2002 |
| CA | 2474059 | A1 | 8/2003 |
| CA | 2314616 | C | 4/2009 |
| CA | 145955 | | 1/2013 |
| CA | 153129 | | 5/2014 |
| CA | 153130 | | 5/2014 |
| CA | 153131 | | 5/2014 |
| CA | 153132 | | 5/2014 |
| CA | 153133 | | 5/2014 |
| CA | 153134 | | 5/2014 |
| CA | 153135 | | 5/2014 |
| CA | 154678 | | 9/2014 |
| CA | 154680 | | 9/2014 |
| CA | 154025 | | 2/2015 |
| CA | 154028 | | 2/2015 |
| CA | 156857 | | 2/2015 |
| CA | 157574 | | 2/2015 |
| CA | 157575 | | 2/2015 |
| CA | 157577 | | 2/2015 |
| CA | 157578 | | 2/2015 |
| CA | 160515 | | 2/2015 |
| CA | 160516 | | 2/2015 |
| CA | 155690 | | 4/2015 |
| CA | 155691 | | 4/2015 |
| CA | 168133 | | 12/2016 |
| CA | 168560 | | 12/2016 |
| CA | 2987917 | A1 | 2/2017 |
| CA | 2996823 | A1 | 3/2017 |
| CA | 3067618 | A1 | 1/2019 |
| EM | 006974754-0003 | | 12/2019 |

* cited by examiner

SYSTEM AND BLADE ASSEMBLY FOR CUTTING FOOD PIECES

FIELD

The present invention relates generally to the art of cutting food pieces and more specifically to a device for cutting vegetables, such as potatoes, into desired shapes. In particular, the device or blade assembly is for cutting food pieces into complex shapes such as helical or twisted wedges.

BACKGROUND

Many food products, particularly vegetables and fruits, are processed prior to sale. Unless the product involved is of a naturally occurring edible size, the product is usually trimmed and sliced, or diced, to an edible size prior to preservation processing such as canning or freezing. Cut food products may include fruits such as apples, or vegetables such as potato, sweet potato, carrot and others. These slicing, dicing and other cutting operations have traditionally been accomplished with mechanical cutters. However, hydraulic cutting apparatuses may also be used. These can be used to cut relatively huge quantities of food product at very high speeds; cutting capacities of 13,600 kilograms to 22,700 kilograms per hour are not unusual.

A typical hydraulic cutter system includes a supply tank full of water. Food pieces are fed into this tank of water and a pump draws the food pieces and water from the supply tank. The water and food pieces are forced through tubes to increase the velocity of the food pieces, as well as to align the food pieces with the cutter. After alignment, the velocity of the water carries the food pieces into a cutter and the food pieces are cut. Once through the cutter assembly, the water speed is slowed down. The water is separated from the cut food pieces and returns back to the supply tank. Such hydraulic cutters are disclosed in, for example, U.S. Pat. Nos. 5,168,784 and 5,179,881, incorporated herein by reference.

Typically, conventional hydraulic cutters have been used for making straight cut food products, and have been less effective for cutting complex shapes.

It may be desirable to cut food products into complex shapes, as consumers may prefer the aesthetic appeal of such shapes, and such shapes may retain dips and garnishes more efficiently. The cutters used to make such complex cuts are typically mechanically driven. In some cases, hydraulic cutting technology has been combined with mechanical cutters (e.g. see U.S. Pat. Nos. 9,089,987 and 9,914,232) such that the hydraulic cutter system is used to deliver the food pieces to a rotating mechanical cutter. These mechanical cutters are large, complex pieces of equipment which have low throughputs and many moving parts, leading to frequent break downs. A typical mechanical cutter used for, e.g. lattice cuts or curly cuts, is extremely limited in speed and capacity.

One drawback with hydraulic cutter systems having mechanical cutters is that the two systems need to be synchronized in order to obtain the desired cut food product. The rate of delivery of the food product to be cut must match the rate at which the food pieces travels through the cutter. If the rate of delivery of the food piece is greater than the rate of travel through the cutter, the cutter system will plug, or the cutter will produce undesirable cuts. A spiral cutter, for example with an imbalance of the two speeds may produce C-shaped product instead of long spirals.

Hydro/mechanical cutters suffer from a reduction in velocity of the water as the food piece nears the cutter assembly. The cutter assembly and/or food piece impedes the water flow and causes surges in the system. This surging has been addressed in various ways in the prior art, for example to provide holes in the cutter assemblies, or to provide water bypass systems around the cutter. However, such modifications typically result in reduced throughput.

Moreover, blades for cutting complex shapes are generally formed by bending flat blades or are milled from a solid block (e.g. a curly cutter may be formed with vertical slicing blades attached to the milled cutter blade). It may be challenging to bend or form a metal blade into a desired shape.

Accordingly, there is a need for a blade assembly and system capable of cutting food pieces into complex shapes, such as helical or twisted shapes, while still maintaining the high throughput of a conventional hydraulic cutter. There is also a need for a system capable of cutting food pieces into complex shapes, that consistently produces correctly cut food product. Additionally, there is a need for a blade assembly without moving parts and capable of cutting food pieces into complex shapes, which can be placed into an existing hydraulic cutter system. Finally, there is a need for blades which can be easily formed into the desired shape for cutting any number of desired food product shapes.

This background information is provided for making information believed by the applicant to be of possible relevance to the present application. No admission is necessarily intended, nor should be construed, that any of the preceding information constitutes prior art against the subject matter presented herein.

SUMMARY

Disclosed herein is an apparatus or system for slicing a food product into complex three-dimensional shapes. The system comprises a blade assembly which may be used with a hydraulic cutter, such that the food pieces to be cut are pumped with fluid by a food pump to an optional alignment system, and then enter the cutter/blade assembly. The blade assembly comprises blades longitudinally oriented along the direction of fluid flow. The minimum and maximum number of blades is determined by the desired shape and size of the food pieces, and accordingly the blade assembly includes a plurality of blades. In some embodiments, the blade assembly comprises at least two or in certain embodiments at least four blades, or the blade assembly may contain up to twenty-two blades. Thus, the assembly may comprise any suitable number of blades; however, an assembly having at least four blades may be most ideal. Upon impact with the blade assembly, the food pieces are both cut and rotated during cutting, producing complex food product shapes such as corkscrews, curved shapes, helical shapes, twisted wedges or twisted sticks/fries. While the blades of the blade assembly may have some degree of minimal rotation, the blade assembly is, ideally, generally stationary or fixed (i.e. the blades do not rotate) to achieve a more desirable product shape. By controlling the number, pitch and position of the blades, the number and shape of food products is selected.

In an embodiment, a blade assembly is provided for cutting food pieces into complex shapes as the food pieces are directed along a direction of flow at the blade assembly. In one embodiment, the blade assembly comprises a plurality of blades, each of the plurality of blades having a length. The length of the blade is oriented along the direction of flow and the blade is twisted along its length.

In an embodiment, the blade assembly comprises a housing having a proximal end and a distal end, and a plurality of blades (where at least four blades are present) are held lengthwise within the housing. Each of the blades has a length, an anchoring edge, a proximal edge, a distal edge and a longitudinal edge, and is twisted along its length. The anchoring edge secures the blade lengthwise within the housing.

Also disclosed herein is a method for cutting food pieces into complex shapes, the method comprising: directing a food piece along a direction of flow towards a blade assembly, wherein the blade assembly comprises a plurality of blades, each of the plurality of blades having a length, wherein the length of the blade is oriented along the direction of flow and the blade is twisted along its length; and cutting the food piece into complex shapes with the at least four blades of the blade assembly.

Additionally disclosed herein is a method for cutting food pieces into complex shapes, the method comprising: directing a food piece along a direction of flow towards a blade assembly, wherein the blade assembly comprises a housing having a proximal end and a distal end, and wherein the plurality of blades are held lengthwise within the housing, each of the plurality of blades having a length, an anchoring edge, a proximal edge, a distal edge and a longitudinal edge, and being twisted along its length, wherein the anchoring edge secures the blade within the housing; and cutting the food piece into complex shapes with the plurality of blades of the blade assembly.

Further disclosed herein is a system for cutting food pieces comprising: a hydraulic flow path; a blade assembly comprising a plurality of blades, each of the plurality of blades having a length, wherein the length of the blade is oriented along the direction of the hydraulic flow path and the blade is twisted along its length; and wherein the hydraulic flow path is configured to direct the food pieces into cutting engagement with the blade assembly.

DETAILED DESCRIPTION

Disclosed herein is a blade assembly having a selected number of blades for cutting food products, such as vegetables or fruit, into complex shapes, including but not limited to corkscrews, curved shapes, helical shapes, twisted wedges or twisted sticks/fries. The assembly comprises a plurality of blades for cutting the food product into at least two to four pieces of similar size and shape. In alternative embodiments, five, six, seven, eight or more blades may be present. In some embodiments, as many as twenty-two blades may be present. Ideally, between four and twenty-two blades should be present.

Figure 9:
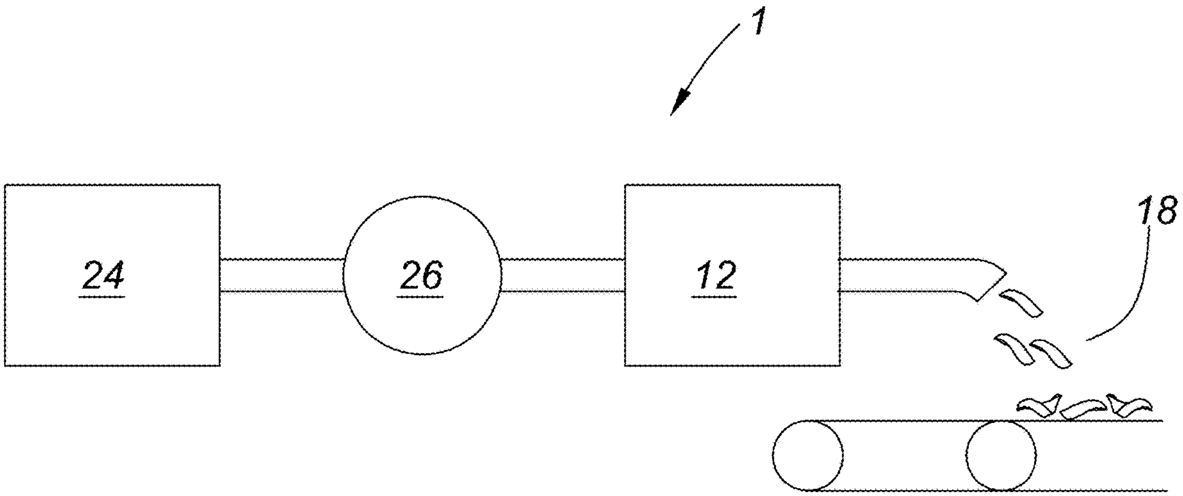
FIG. 9 is a schematic illustration of hydraulic cutter system including a blade assembly according to an embodiment of the invention.

The blade assembly disclosed herein may be used with any conventional hydraulic cutter system (1) (see FIG. 9). Such conventional hydraulic cutter systems typically work as follows. Food pieces, such as root vegetables, for example potatoes, are fed into a supply tank (24) full of fluid, such as water, then a pump (26) (e.g. a radial type impeller) draws the food pieces and fluid from the supply tank and forces the fluid and food pieces through tubes to transport the food pieces and accelerate them to cutting velocity. For example, the tubes may comprise a transfer tube and/or a tapered reducer tube. An alignment system may be present to ensure that the food piece is cut along the long axis to obtain food pieces of maximum length. The alignment system may comprise, for example, an elastomeric tube, or an alignment tube containing internal alignment vanes. After alignment, the food pieces are conveyed into the cutter box or housing (12) where the blade assembly described herein is located.

Figure 8:
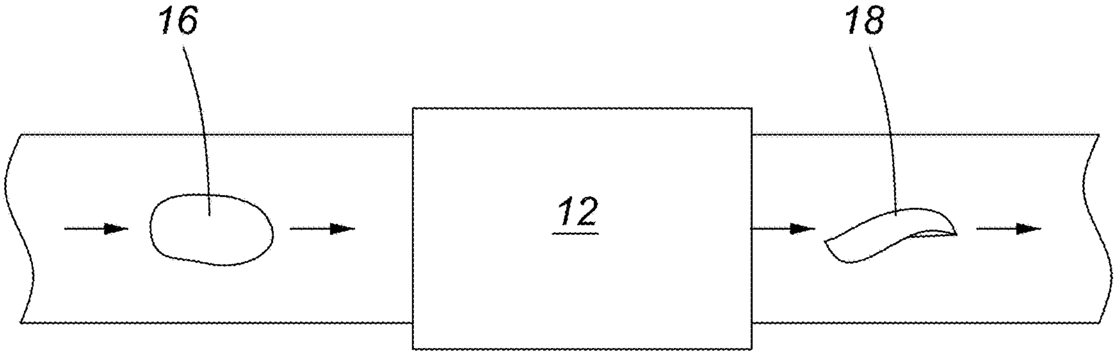
FIG. 8 is a schematic illustration of a food piece passing through the housing containing the blade assembly, and an exemplary cut food piece.

As shown in FIG. 8, the fluid (traveling at about 6-12 m/s) carries the food pieces (16) into the cutter box and the food pieces are cut and guided around the blade assembly to produce a complex shape (18). In some embodiments, the food pieces may be rotated by the blade assembly while being cut. Rotation may include less than 360° of rotation, or may include a full 360° rotation or a plurality of such rotations. Once through the cutter assembly, the fluid is slowed down, for example through an expander tube with increasing pipe diameter. The fluid is separated from the cut food pieces and returned back to the supply tank.

The food pieces may be peeled or unpeeled prior to cutting, or may be sorted by size prior to cutting. Optionally, the food pieces may be softened prior to cutting. Softening may be accomplished by electroporation, heat conditioning, or any other suitable method.

The hydraulic cutter system may include a rotatable cutter assembly magazine. With the use of such a magazine, a plug or blockage in one cutter assembly will increase the fluid pressure in the piping, resulting in rotating the plugged cutter out of the flow and automatically replacing it with a new cutter system or assembly. This arrangement ensures uninterrupted cutting.

Blades (2) of the blade assembly comprise an anchor or anchoring edge (4) which serves to secure the blade or blades in a housing (12*a*, 12*b*). The housing (12*a*, 12*b*) may comprise one or more channels (14) shaped to accommodate the anchors (4). The anchor may be shaped to secure the blade in the housing during operation of the blade assembly, but allow for removal of the blade for maintenance or cleaning. In an exemplary embodiment, the anchor (4) may have a generally T-shaped cross-section, or a generally Y-shaped cross-section.

The blades may be secured to the housing (12*a*, 12*b*) or cutter block by means of suitable fasteners such as bolts or screws (not shown), or they may be held immovable in the housing by means of compressive force. In an embodiment, both the blades and the housing are precisely made, for example by 3D printing, such that the channels in the housing are precisely complementary to the anchoring edge, and the blades fit securely into the channels.

The lengthwise accommodation of the blade in the housing provides support and strength to the blade. This is important since the blades must have sufficient strength to cut the food pieces and to cause them to rotate during cutting.

To effectively cut the food pieces, the blades must be sufficiently long to provide the necessary force for rotating the food pieces during cutting, The length of the blades will depend on the size of the food pieces to be cut and the desired size and shape of the cut food product. In one embodiment, the blade assembly may have a four-inch bore and the blades may be six to eight inches in length.

The blade comprises a proximal edge (6), a distal edge (8) and a longitudinal edge (10). The proximal edge is oriented such that the food pieces make contact first with the proximal edge. The cut food pieces exit the blade assembly at its distal end by the distal edge of the blade. In an embodiment, the longitudinal edge and/or the proximal edge and the blade may be smooth. In an embodiment, the longitudinal edge and/or the proximal edge and/or the blade surface may be textured so as to produce a textured food product. For example, the blades may be corrugated so as to produce a crinkle-cut.

Figure 1:
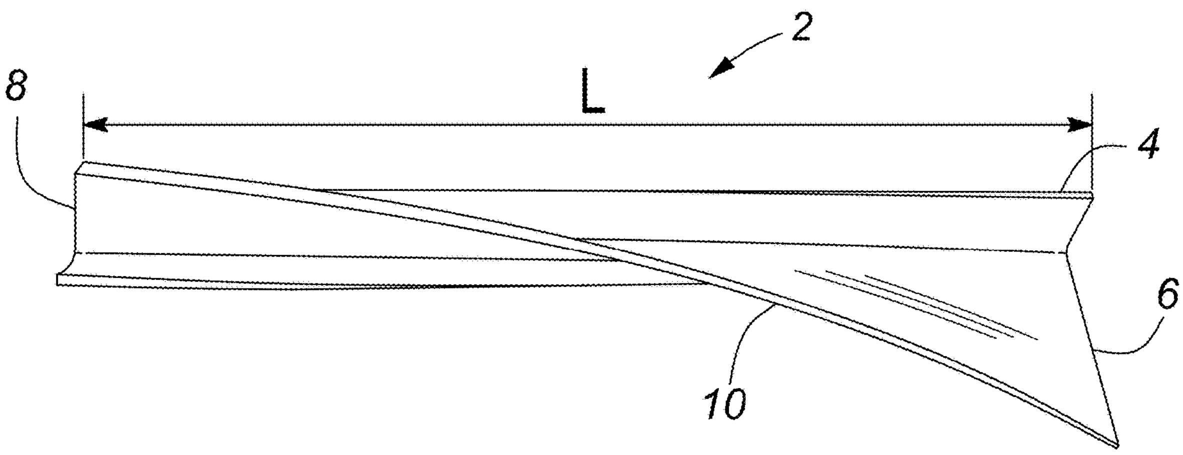
FIG. 1 is a perspective view of a single cutter blade according to one embodiment.

In an embodiment, such as illustrated in FIG. 1, the blade is twisted along its length (L) such that the pitch of the blade close to the proximal edge is noticeably different from the pitch of the blade at the distal edge. For example, the distal edge may be rotated 180 degrees or more as compared to the proximal edge. The degree to which the blade is twisted or spiraled affects the shape of the food product. Further, the anchoring edge (4) or backbone of the blade may also be twisted along its length. The backbone may be twisted or spiraled in opposition to the twisting of the blade, such that the shape of the blade generally resembles a double helical shape.

As illustrated in FIGS. 7*a*-7*d*, the blade may be thinner at the proximal edge (6) and slightly thicker at the distal edge (8). In an embodiment, the proximal edge may be oriented so as to have an angle of attack of 90° (i.e. perpendicular to the path of fluid flow along which the food pieces are carried). However, the blades may be oriented so as to provide any suitable angle of attack, such as less than 90 degrees, depending on the desired shape of the cut food pieces.

The blade assembly is preferably fixed (i.e. does not rotate), but the twisted blade shape will effectively rotate the food piece as it is being cut, allowing for a complex shaped food product. For example, the food piece may rotate between about 45 degrees and about 1660 degrees during cutting.

Figure 2A:
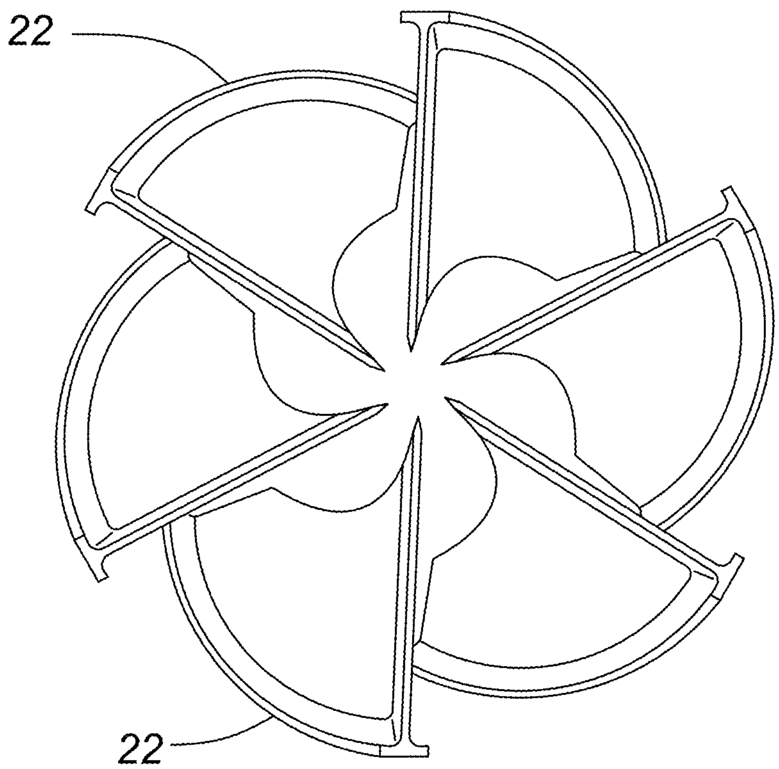
FIGS. 2*a-c* are perspective views of blade assemblies in a non-joined configuration, according to embodiments with six, four and ten blades, respectively.

FIG. 2*a* illustrates an embodiment of the blade assembly having six identical blades (22) which are not joined together at any point, including at an axial center line of the assembly. The blades are spaced apart sufficiently to allow for ease of movement of the food pieces during cutting, but are also sufficiently close together that the food pieces will easily break apart after cutting is completed. The blades may, for example, be closer together at the proximal end and further apart at the distal end. This may assist in decreasing resistance to the food pieces, particularly at the proximal end. Too little resistance to the food piece will result in plugging of the blade assembly, while too much resistance will result in breaking of the food piece.

Alternatively, the blades may be joined at at least one point, for example at the proximal edge end, and optionally the point of connection may be along an axial center line of the assembly. The proximal end of the blades may be slightly thinner in comparison to the distal end of the blades. This may facilitate cutting of the food pieces as they strike the blade assembly at high speed.

Figure 2B:
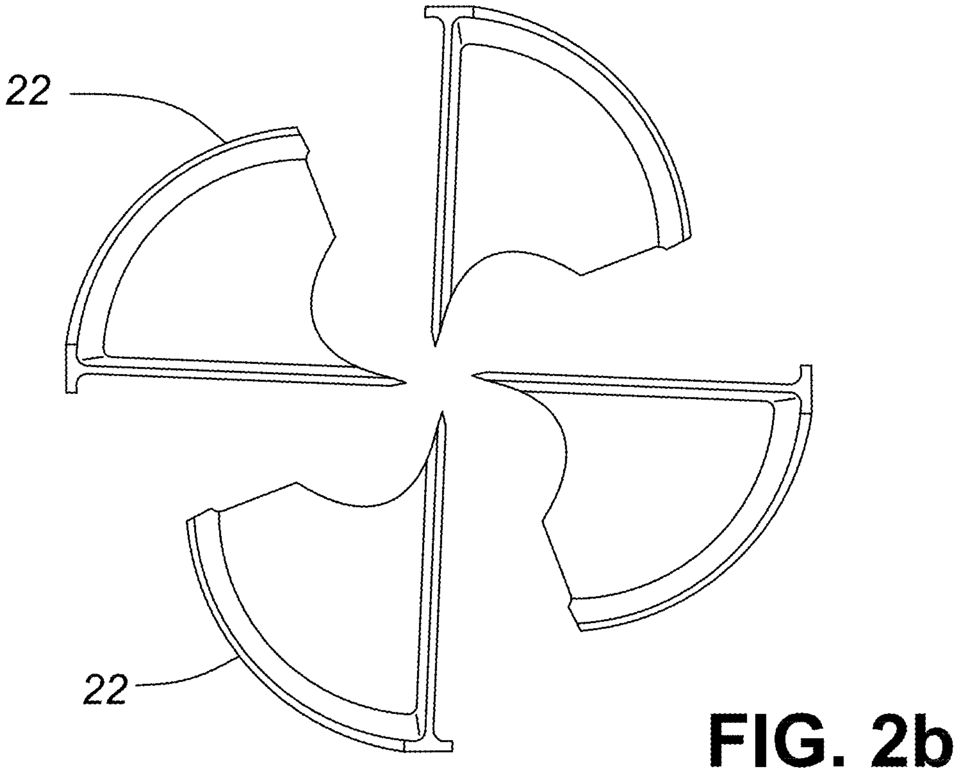
Figure 2C:
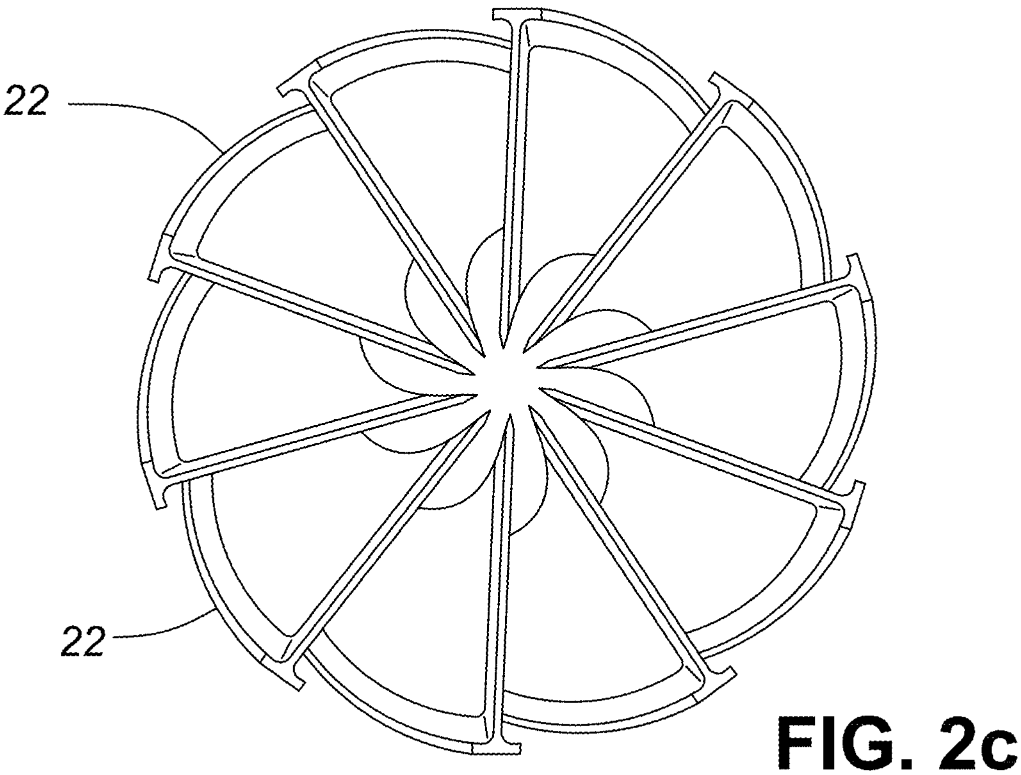

The blade assembly may comprise at least two blades, at least three blades or at least four blades. In some embodiments, the blade assembly may comprise five, six, seven, eight, nine, ten, eleven, twelve, thirteen, fourteen, fifteen, sixteen, seventeen, eighteen, nineteen, twenty, twenty-one or twenty-two blades. Exemplary embodiments with four and ten blades, respectively, are illustrated in FIGS. 2*b* and 2*c*. The blades may be arranged in a generally circular pattern, or any other suitable pattern, determined by the desired shape for the cut food product.

Figure 3:
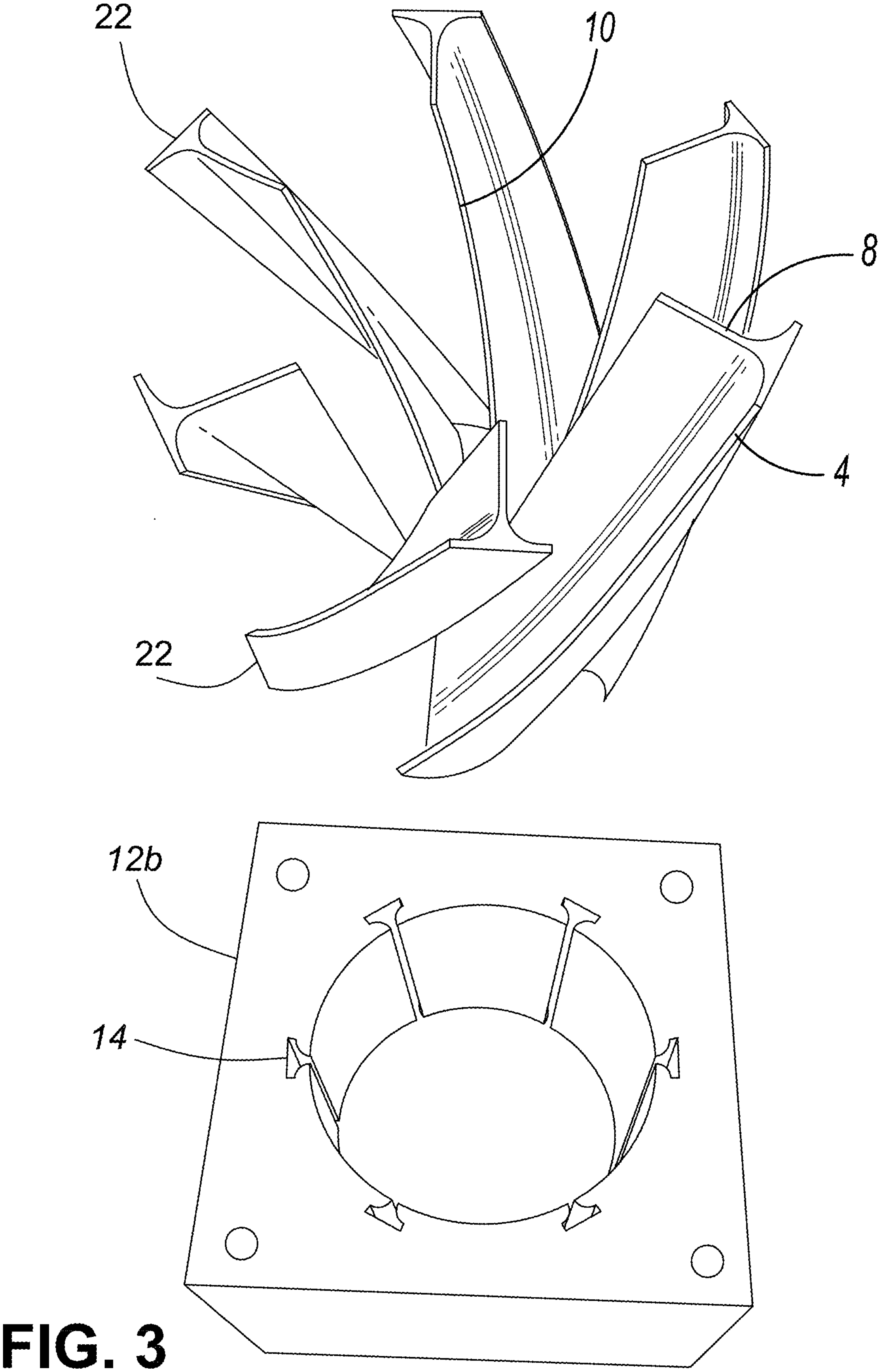
FIG. 3 is a perspective view of an assembly of blades according to one embodiment, where the blades are shown with, but not connected to, a front portion of a housing.
Figure 4:
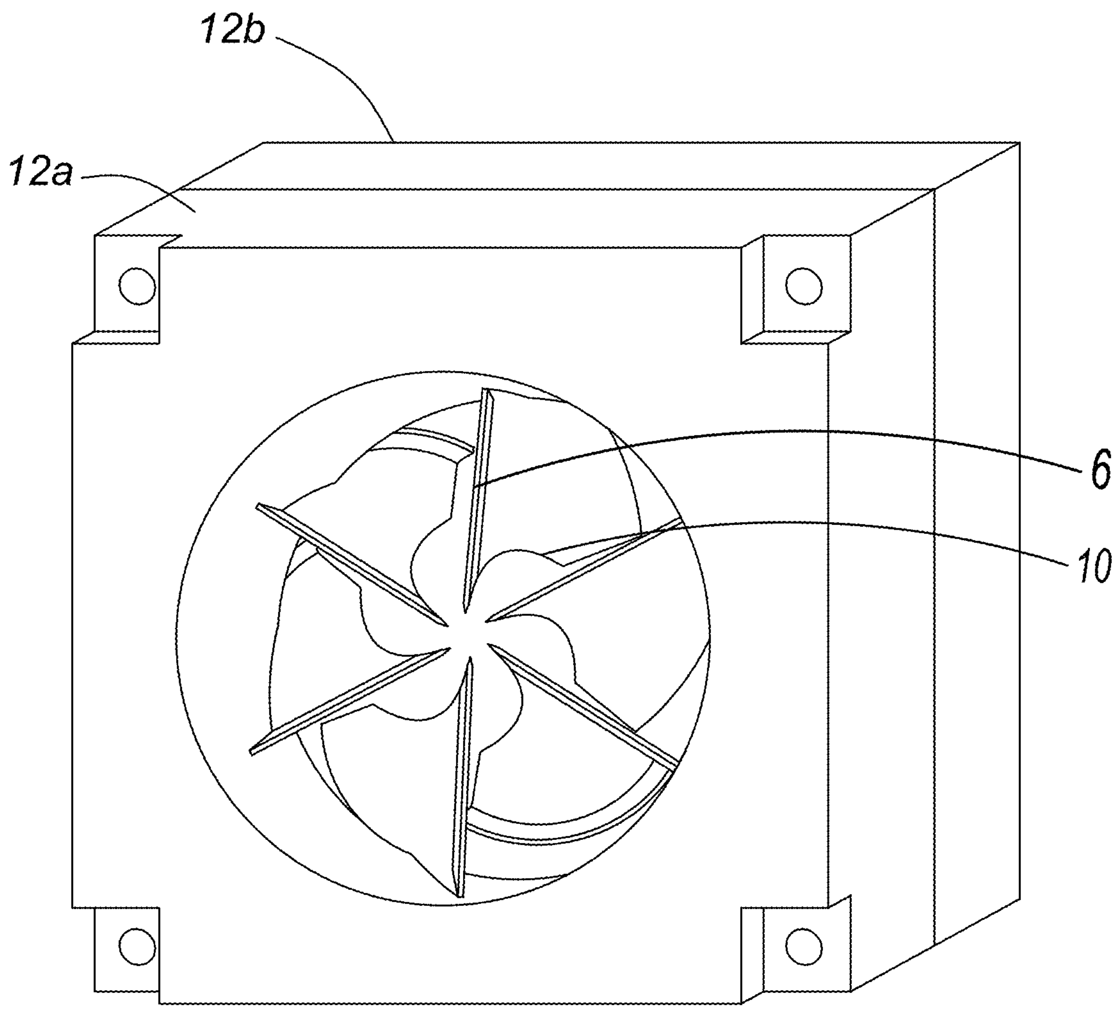
FIG. 4 is a perspective view of an assembly of blades according to one embodiment, where the blades are inserted into a two-part housing.
Figure 5:
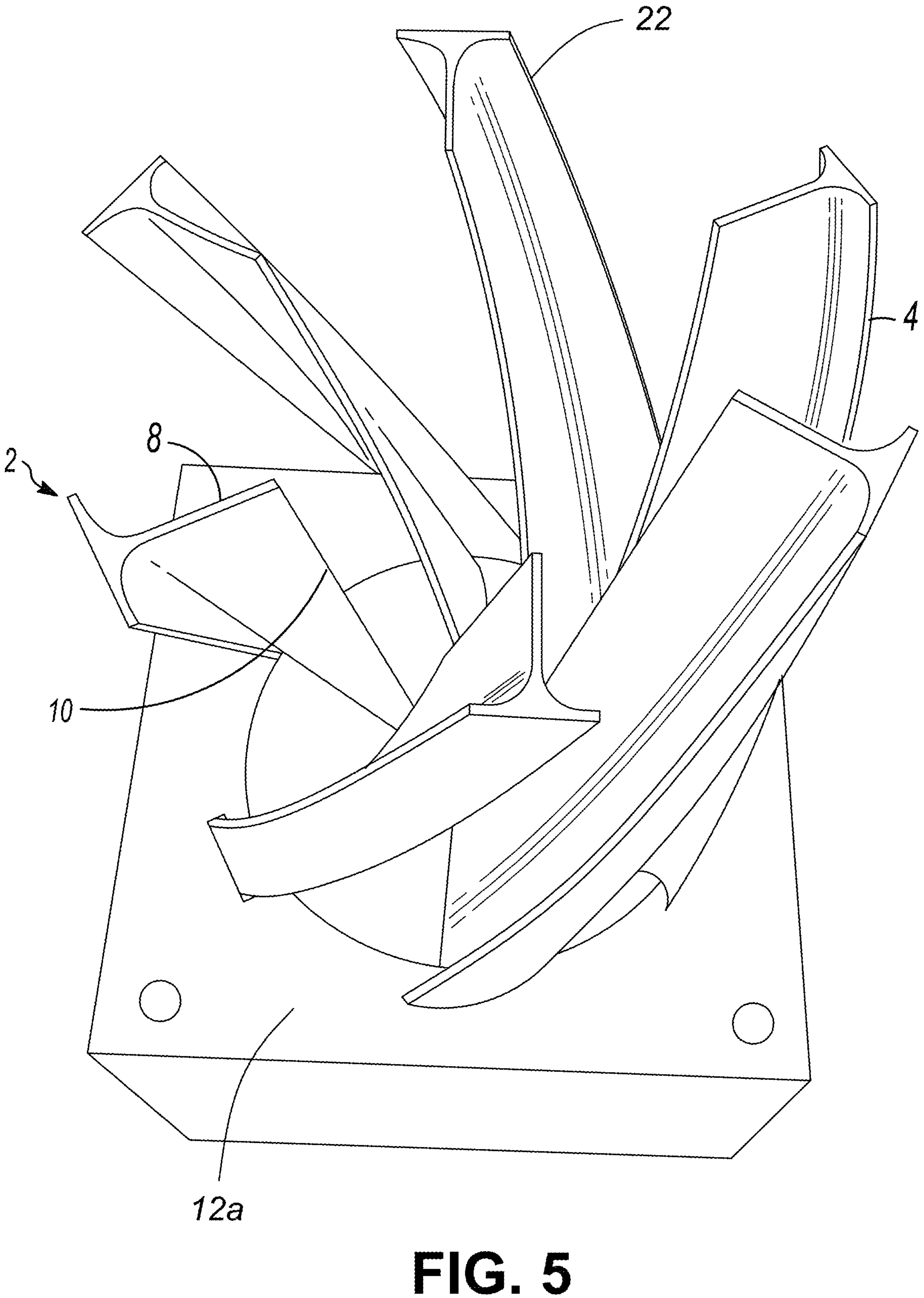
FIG. 5 is a perspective view of an assembly of blades according to one embodiment, where the blades are inserted into a front portion of a housing.

The blade or blades may be housed in a two-part housing having proximal (12*a*) and distal (12*b*) ends, releasably secured together with bolts or screws, as illustrated in FIGS. 3-5. Alternatively, the housing may comprise multiple pieces, or may be a single block (not illustrated).

Figure 6A:
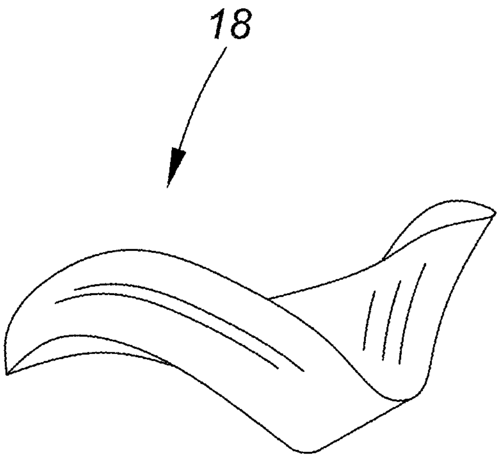
FIG. 6*a* is a perspective view of a food product cut by a blade assembly according to one embodiment.
Figure 6B:
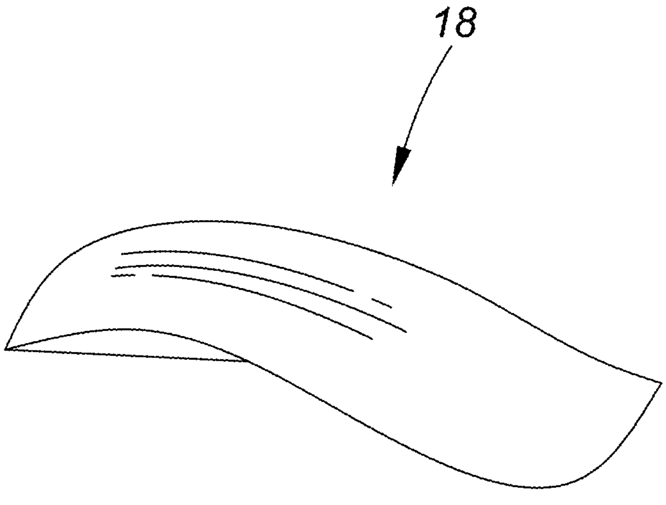
FIG. 6*b* is a perspective view of a food product cut by a blade assembly according to one embodiment.
Figure 7A:
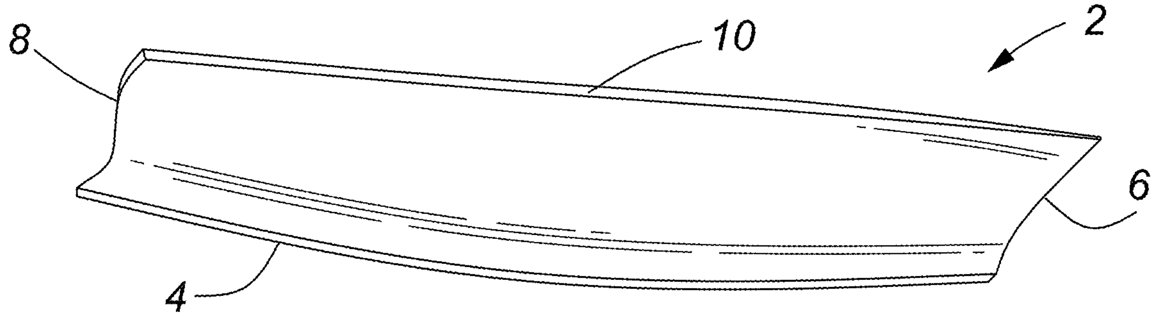
FIG. 7*a* is a side perspective view of a blade according to one embodiment.
Figure 7B:
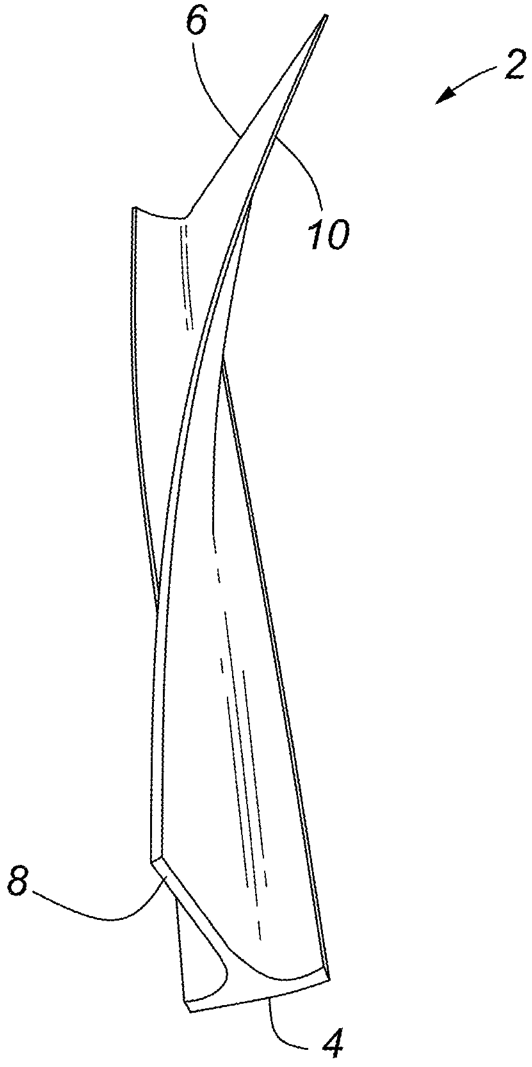
FIG. 7*b* is a back-end perspective of a blade according to one embodiment.
Figure 7C:
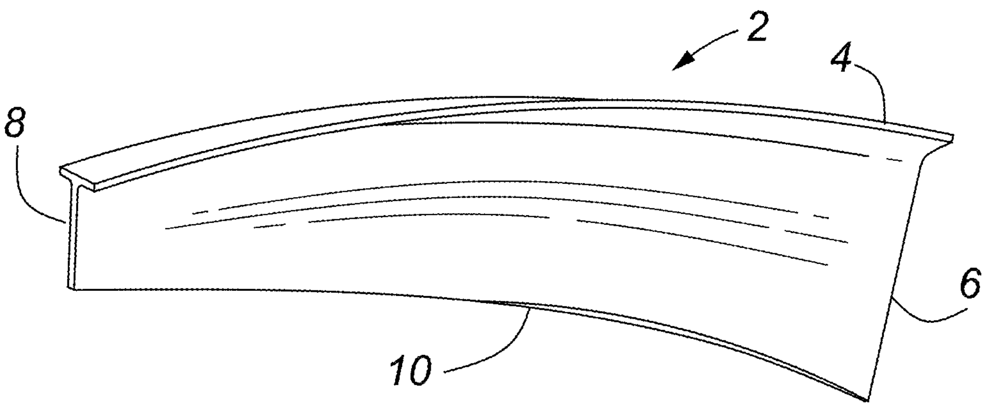
FIG. 7*c* is a side perspective view of a blade according to one embodiment.
Figure 7D:
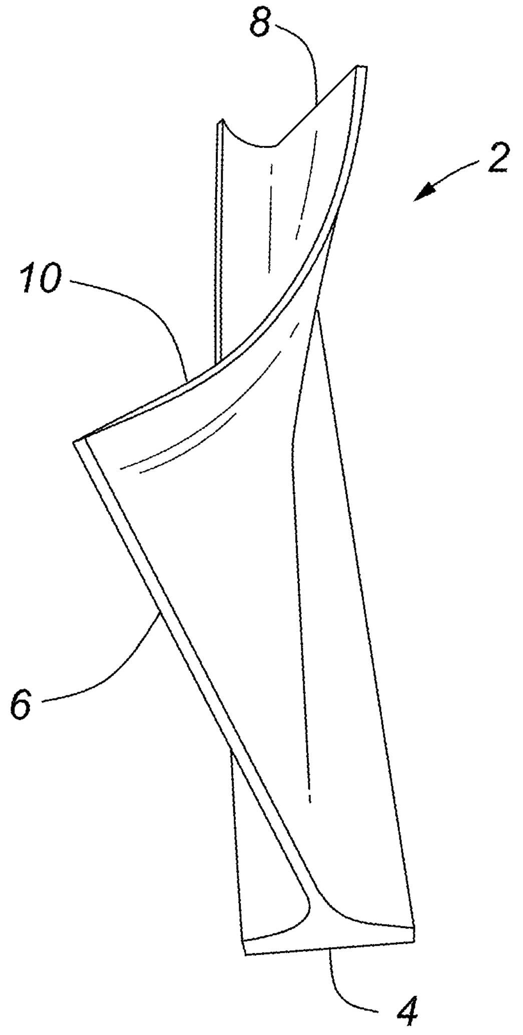
FIG. 7*d* is a front-end perspective a blade according to one embodiment.

Exemplary cut food products (18) are illustrated in FIGS. 6*a* and 6*b*. The blades may be arranged to cut twisted wedges as shown in FIGS. 6*a* and 6*b*, but other shapes, such as helical, corkscrew or twisted sticks or fries, are possible. In an embodiment, the cut food product may have a cross-sectional diameter as small as about 4 mm, or as large as about 25 mm, but larger or smaller products are possible, as are products with a variable cross-sectional diameter.

The blades may be 3D-printed of any suitable food grade metal, for example titanium or stainless steel. Such process allows for manufacture of a blade of any desired shape. The blades are then polished to reduce friction, and sharpened. For example, the blade may be sharpened only at the proximal edge, or at all edges which contact the food pieces. This process may allow for production of blades which are strong enough and long enough to produce the desired product shape. This process may also allow for production of blades with a suitable twisted shape, produced exactly to measure.

Provided herein are the following exemplary embodiments:

Embodiment 1: A blade assembly for cutting food pieces into complex shapes as the food pieces are directed along a direction of flow at the blade assembly, wherein the blade assembly comprises a plurality of blades, each of the plurality of blades having a length, wherein the length of the blade is oriented along the direction of flow and the blade is twisted along its length.

Embodiment 2: The blade assembly of embodiment 1, wherein the blades are stationary.

Embodiment 3: The blade assembly of embodiment 1 or 2, wherein the food pieces are rotated by the blade during cutting.

Embodiment 4: The blade assembly of embodiment 1, 2 or 3 wherein a backbone of the blade is twisted in opposition to twisting of the blade.

Embodiment 5: The blade assembly of embodiment 1, 2, 3 or 4, wherein the complex shapes are twisted shapes, corkscrews, curved shapes, or helical shapes.

Embodiment 6: The blade assembly of embodiment 1, 2, 3, 4 or 5, further comprising a hydraulic system for directing the food products in the direction of flow along a hydraulic flow path.

Embodiment 7: The blade assembly of embodiment 1, 2, 3, 4, 5 or 6, wherein the plurality of blades comprises between four and twenty-two blades.

Embodiment 8: The blade assembly of embodiment 5, 6 or 7, wherein the twisted shapes are twisted wedges or twisted fries.

Embodiment 9: A blade assembly comprising a housing having a proximal end and a distal end, and a plurality of blades held lengthwise within the housing, each of the plurality of blades having a length, an anchoring edge, a proximal edge, a distal edge and a longitudinal edge, and being twisted along its length, wherein the anchoring edge secures the blade within the housing.

Embodiment 10: The blade assembly of embodiment 9, wherein the proximal edges have a first angle of attack of less than 90 degrees.

Embodiment 11: The blade assembly of embodiment 9 or 10, wherein the proximal edges have a first angle of attack of 90 degrees.

Embodiment 12: The blade assembly of embodiment 9, 10 or 11, wherein the anchoring edges have a generally T- or Y-shaped cross-section.

Embodiment 13: The blade assembly of embodiment 9, 10, 11 or 12, wherein the plurality of blades comprises between four and twenty-two blades.

Embodiment 14: The blade assembly of embodiment 13, wherein the plurality of blades are unconnected to each other at an axial center line of the assembly.

Embodiment 15: The blade assembly of embodiment 13, wherein the plurality of blades are connected to each other at an axial center line of the assembly.

Embodiment 16: A method for cutting food pieces into complex shapes, the method comprising:

a) directing a food piece along a direction of flow towards a blade assembly, wherein the blade assembly comprises a plurality of blades, each of the plurality of blades having a length, wherein the length of the blade is oriented along the direction of flow and the blade is twisted along its length; and b) cutting the food piece into complex shapes with the plurality of blades of the blade assembly.

Embodiment 17: The method of embodiment 16, wherein the blades are stationary.

Embodiment 18: The method of embodiment 16 or 17, wherein the food pieces are rotated by the blades during cutting.

Embodiment 19: The method of embodiment 16, 17 or 18, wherein the complex shapes are twisted shapes, corkscrews, curved shapes, or helical shapes.

Embodiment 20: The method of embodiment 16, 17, 18 or 19, wherein the food pieces are directed in the direction of flow along a hydraulic flow path.

Embodiment 21: The method of embodiment 16, 17, 18, 19 or 20, wherein the plurality of blades comprise four to twenty-two blades.

Embodiment 22: The method of embodiment 19, wherein the twisted shapes are twisted wedges or twisted fries.

Embodiment 23: The method of embodiment 16, 17, 18, 19, 20, 21 or 22, wherein the blade assembly comprises a housing having a proximal end and a distal end, and wherein the plurality of blades are held lengthwise within the housing, each of the plurality of blades having an anchoring edge, a proximal edge, a distal edge and a longitudinal edge, and being twisted along its length, wherein the anchoring edge secures the blade within the housing.

Embodiment 24: A system for cutting food pieces comprising: a hydraulic flow path; a blade assembly comprising a plurality of blades, each of the plurality of blades having a length, wherein the length of the blade is oriented along the direction of the hydraulic flow path and the blade is twisted along its length; and wherein the hydraulic flow path is configured to direct the food pieces into cutting engagement with the blade assembly.

It is believed that the present invention and its advantages will be understood by the foregoing description, and it will be apparent that various changes may be made in the form, construction and arrangement of the components thereof without departing from the scope and spirit of the invention, or without sacrificing all of its material advantages. The form herein before described being an explanatory embodiment thereof, it is the intention of the following claims to encompass and include such changes.

We claim:

1. A blade assembly for cutting food pieces into complex shapes as the food pieces are directed along a direction of flow, through the blade assembly, wherein the blade assembly comprises a plurality of blades arranged about a central, longitudinal axis, each blade of the plurality of blades including anchoring edge and a longitudinal edge, the anchoring edge defining a length oriented along the direction of flow parallel the central, longitudinal axis, the longitudinal edge extending outward from the anchoring edge and twisted along its length from its proximal end to its distal end relative to the anchoring edge, and wherein the plurality of blades do not extend through the central, longitudinal axis.

2. The blade assembly of claim 1, wherein the blades are stationary.

3. The blade assembly of claim 1, wherein the blades are configured to rotate the food pieces during cutting.

4. The blade assembly of claim 1, wherein a backbone of the blade is twisted in opposition to twisting of the blade.

5. The blade assembly of claim 1, wherein the complex shapes are twisted shapes, corkscrews, curved shapes, or helical shapes.

6. The blade assembly of claim 1, wherein the direction of flow is along a hydraulic flow path.

7. The blade assembly of claim 1, wherein the plurality of blades comprise four to twenty-two blades.

8. The blade assembly of claim 5, wherein the twisted shapes are twisted wedges or twisted fries.

9. A blade assembly comprising a housing having a proximal end and a distal end, a housing bore, and a plurality of blades held along their length, lengthwise within the housing and wherein the plurality of blades is arranged about a central, longitudinal axis that is generally parallel to a longitudinal axis of the housing bore, each of the plurality of blades having a length, an anchoring edge securing the blade along its length within the housing, a proximal edge, a distal edge and a longitudinal edge opposite the anchoring edge, and being twisted along its length, and wherein the plurality of blades do not extend through the central, longitudinal axis of the housing bore.

10. The blade assembly of claim 9, wherein the proximal edges have a first angle of attack of less than 90 degrees.

11. The blade assembly of claim 9, wherein the proximal edges have a first angle of attack of 90 degrees.

12. The blade assembly of claim 9, wherein the anchoring edges have a generally T- or Y-shaped cross-section.

13. The blade assembly of claim 9, wherein the plurality of blades comprise four to twenty-two blades.

14. The blade assembly of claim 9, wherein the blades are unconnected to each other at an axial center line of the assembly.

15. The blade assembly of claim 9, wherein the blades are connected to each other at an axial center line of the assembly.

16. A method for cutting food pieces into complex shapes, the method comprising:

directing a food piece along a direction of flow towards a blade assembly, wherein the blade assembly comprises a plurality of blades arranged about a central, longitudinal axis parallel to the direction of flow each of the plurality of blades having a length, wherein the length of the blade is oriented along the direction of flow and parallel to the central, longitudinal axis and the blade is twisted along its length; and cutting the food piece into complex shapes with the plurality of blades of the blade assembly; and wherein the plurality of blades do not extend through the central, longitudinal axis of the housing bore.

17. The method of claim 16, wherein the blades are stationary.

18. The method of claim 16, wherein the blades are configured to rotate the food pieces during cutting.

19. The method of claim 16, wherein the complex shapes are twisted shapes, corkscrews, curved shapes, or helical shapes.

20. The method of claim 16, wherein the blade assembly comprises a housing having a proximal end a distal end and a bore, and wherein the plurality of blades are held along their length, lengthwise within the housing, each of the plurality of blades having an anchoring edge, a proximal edge, a distal edge and a longitudinal edge, and being twisted along its length, wherein the anchoring edge secures the blade within the housing.

* * * * *